(12) United States Patent
Nishi

(10) Patent No.: US 6,224,278 B1
(45) Date of Patent: May 1, 2001

(54) KEY PAD WITH RIGID KEY TOP HAVING BOTH SILICONE AND URETHANE ADHESION LAYERS

(75) Inventor: Kengo Nishi, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 0 days.

(21) Appl. No.: 09/253,405

(22) Filed: Feb. 19, 1999

(51) Int. Cl.[7] .............. B41J 5/16; H01H 13/705
(52) U.S. Cl. ............ 400/495; 400/490; 200/345; 200/514; 156/325; 156/277
(58) Field of Search .................. 400/472, 487, 400/490, 491, 491.2, 493, 494, 495; 200/345, 514; 235/145 R; 156/325, 329, 327.5, 275.7, 277

(56) References Cited

U.S. PATENT DOCUMENTS 5,888,656 * 3/1999 Suzuki et al. .............. 200/333
6,084,190 * 7/2000 Kenmochi .............. 200/345

FOREIGN PATENT DOCUMENTS

| 48-15161 | 7/1946 | (JP) . |
| 7-95411 | 10/1995 | (JP) . |
| 2627692 | 7/1997 | (JP) . |

* cited by examiner

Primary Examiner—John S. Hilten
Assistant Examiner—Leslie J. Grohusky
(74) Attorney, Agent, or Firm—McGlew & Tuttle, P.C.

(57) ABSTRACT

A key pad with rigid resin key top, preventing key top detachment or dislocation, and allowing to omit key detachment prevention means such as collar and to simplify the structure, and adhering to a silicone rubber key pad 1,7 with silicone base adhesive 15, 20, by preparing urethane base adhesion substrate layer 3, 9 on a back 2, 8 of a key top made of rigid resin.

6 Claims, 2 Drawing Sheets

EXAMPLE 1

Fig. 1  EXAMPLE 1
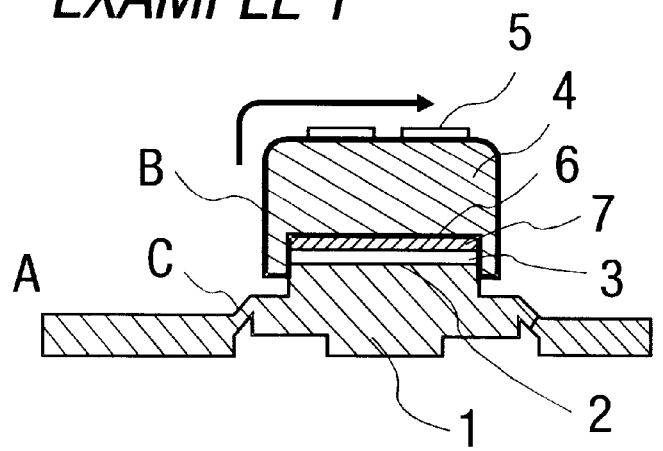
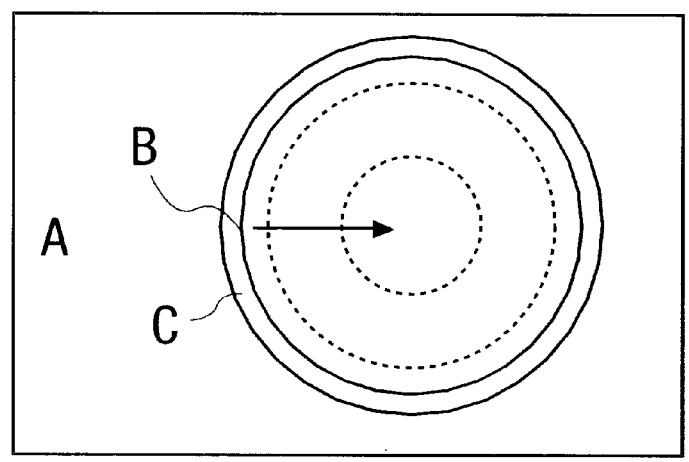
Fig. 2  EXAMPLE 2
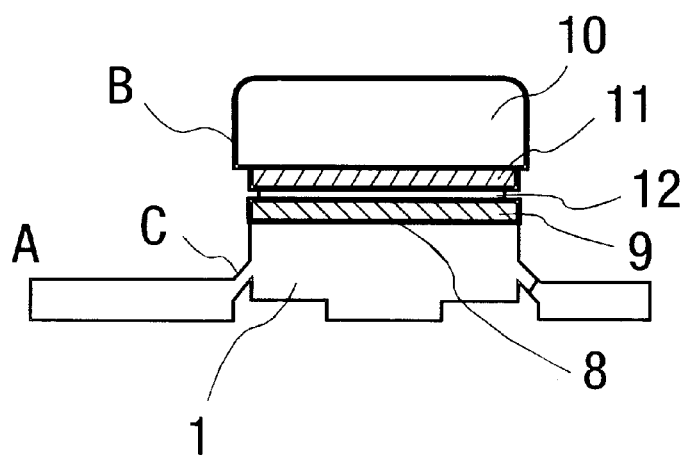

Fig. 3  EXAMPLE 3
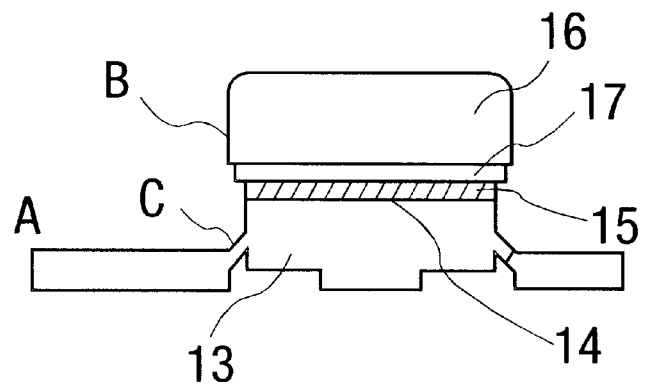
Fig. 4  Comparative Example 1
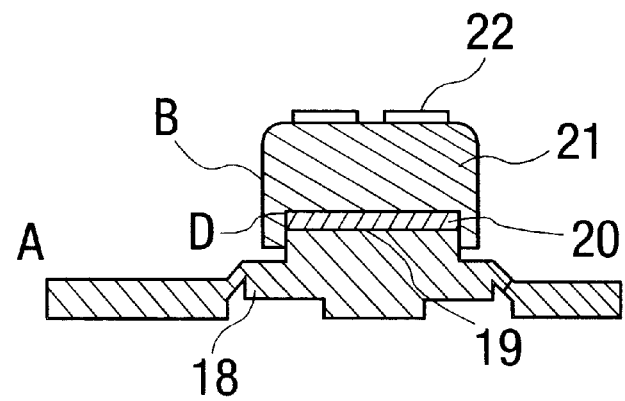
Fig. 5  Comparative Example 2
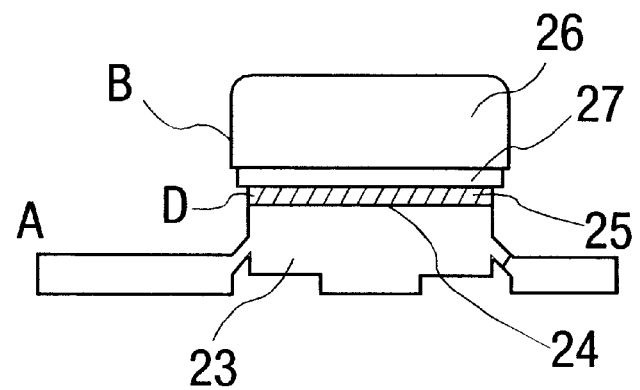

KEY PAD WITH RIGID KEY TOP HAVING BOTH SILICONE AND URETHANE ADHESION LAYERS

BACKGROUND OF THE INVENTION

1. Technical Field of the Invention

The present inventions relates to a beautiful and quality key pad to be used for portable phone, portable information terminal, remote control for various home electric apparatuses, card remote control or various keyboards.

2. Related Art

Silicon rubber or the like has been conventionally used as a member for a conventional key pad, because of their excellent low temperature resistance, heat resistance, weather resistance, precise formability and electric insulation. As a key top, soft rubber has been used for disposing graphics composed of character, number, symbol or picture on its surface or light masking portion has been arranged to dispose graphics formed by cutting out a character, number, symbol or picture.

However, as silicone base coating has been used, in every case, as material of graphics to be formed on theses surfaces, they are worn or broken by finger pressure or friction with clothing resulting in the deterioration of visual recognition or appearance.

Therefore, Japanese Utility Model Laid-Open Shouwa 48-15161, Japanese Patent Publication Heisei 7-095411 or Japanese Patent 2627692 have proposed a method wherein a key top part is formed separately with rigid resin for printing its surface or back or elsewhere and then integrated by engaging with a silicone key pad or adhering with adhesive or both faces adhesive tape or the like.

SUMMARY OF THE INVENTION

However, as silicone rubber is less adhesive, silicone base adhesives has been used generally for adhering them. Silicone base adhesives include additional reaction type and condensation reaction type and, relatively high strength silicone adhesives are of condensation reaction type.

On the other hand, adhesives of condensation reaction type take several hours to several days for hardening, lowering their productivity; if a higher productivity is required, it has been necessary to use those of additional reaction type having faster reaction.

However, silicone base adhesives of additional reaction type are less adhesive with resin or printing ink or other organic compound used for a key top, peeling easily after the adhesion. It has been necessary in practice to arrange a collar or the like on the key top part in order to avoid their detachment.

Moreover, the adhesion portion can be treated with primer, but is increases the number of process, resulting in low productivity. On the other hand, Japanese Patent 2627692 does not describe clearly these points.

The Present Invention relates to a keypad with rigid resin key top, solving these problems.

The key pad with rigid resin key top of the present Invention is a method for manufacturing a key pad with rigid resin key top comprising steps of preparing urethane base adhesive substrate on the back face of a key top made of rigid resin and for adhering with a silicone rubber made key pad, by enhancing the adhesive strength of silicone base adhesives to be used, characterized by that the key top does not detach nor dislocated, allowing to omit collar or other means for preventing key detachment and to simplify its structure.

BRIEF DESCRIPTION OF THE DRAWINGS

FIG. 1 is a vertical cross-portion showing the composition of the example 1;

FIG. 2 is a vertical cross-portion showing the composition of the example 2;

FIG. 3 shows the arrangement of the example 3;

FIG. 4 shows the arrangement of the comparative example 1; and

FIG. 5 shows the arrangement of the comparative example 2.

DETAILED DESCRIPTION OF THE PREFERRED EMBODIMENTS

Now, the Invention will be described more in detail.

As keypad material, silicone rubber shall be used for its excellent low temperature resistance, heat resistance, precise formability and electric insulation. Graphics composed of character, number, symbol or picture may be disposed on its surface or light masking may be arranged to dispose graphics formed by cutting out a character, number, symbol or picture.

The key top is made of rigid resin and, urethane base adhesive substrate is prepared on the adhesion surface of silicone base adhesive, to enhance the adhesive strength of silicone base adhesives.

The rigid resin key top used for the Invention is a molded resin key top or a ground resin key top. The molded resin key top can be manufactured by using a mould of desired key top configuration, charging heat melt resin or liquid non hardened resin into the resin and hardening it by injection molding, compression molding, transfer molding or rotation molding.

Composition, kind, elasticity, color of the rigid resin key top are not particularly limited, but as indication, polycarbonate resin, acrylic resin, ABS resin or other thermoplastic resins are largely used for their formability, cost and appearance. Graphics composed of character, number, symbol or picture may be disposed on its surface or back, or light masking may be arranged to dispose graphics formed by cutting out a character, number, symbol or picture. Moreover, coating layer may be prepared over these graphics.

Ink for printing graphics to be disposed on the back of rigid resin key top is not particularly limited, however, for instance, acrylic base or polyester base, PVC base or urethane base ink may be used.

The form of the rigid resin key top adhesion portion may not be flat and may have irregularities arranged for positioning with the object to be adhered.

Urethane base adhesive substrate layer used for the Invention is an organic resin having urethane links in a polymer. To be more specific, it is obtained by the reaction between organic compounds having isocyanate group and organic compounds having active hydrogen group such as hydroxyl group or amino group and their polymerization.

Organic compounds having isocyanate group include, for instance, tolylenediisocyanate, xylilenediisocyanate, methylcyclohexylene-2,4-diisocyanate, hexamethylenediisocyanate, isophoroneisocyanate, lysineisocyanate methylester, or doublet and triplet of these isocyanates or those partially degenerated by polyhydric alcohol.

Organic compounds having active hydrogen group such as hydroxyl group or amino group include polyester polyol, polyurethane polyol, polyether polyol, polycarbonate polyol, polyether polyamine or the like. They may be mixed, applied, reacted and polymerized to obtain a reaction type coating, or they may also be polymerized beforehand, then diluted by solvent or the like to obtain solvent evaporation type painting. Their viscosity shall be adjusted appropriately by solvent or the like, and charge, colorant, catalyst or others are added as necessary before use. Hardening method or elastic modulus is not limited, but as for color, semi-translucent or translucent member should be used if the key top part shall be illuminated.

For applying the adhesive substrate layer, in addition to screen printing method, dispenser method, potting method, pad-printing method, spray method or transfer method may also be used without particular specification.

The thickness of the adhesive substrate layer is not particularly limited, preferably it is between 0.1 μm and 100 μm. Less than 0.1 μm, the adhesive substrate layer resistance is insufficient and more than 100 μm, the application becomes difficult.

On the other hand, if urethane base ink is used for printing graphics to be disposed on the back of rigid resin key top, the graphics printing layer would act as adhesive substrate layer, dispensing with a new layer as adhesive substrate layer, resulting in reduction of printing steps.

If the key top is to be illuminated, graphics disposed on the back of the resin key top is to be configured to be recognized through the rigid resin key top or, moreover, these graphics are to be illuminated, the rigid resin key top member, graphics print portion to be realized on the back of the key top, the adhesive substrate layer and silicone adhesive should be semi-translucent or translucent.

If translucent silicone adhesive is used to adhesive the rigid resin key top, the urethane base adhesive layer is also translucent and at least a part of the rigid resin key top member is made of translucent member, it can naturally be composed to allow to recognize through them characters, numerals, symbols, pictures or the like realized on the key pad surface, graphics made by disposing light masking portion and cutting out characters, numerals, symbols, pictures or the like, the color or the others.

To position the rigid resin key top for adhesion, irregularities for fitting may be disposed on either or both of key pad and rigid resin key top, or a jig may be used to embrace the key pad and the rigid resin key top from outside.

Silicone base adhesive is applied to the keypad or the rigid resin key top, then they are applied the one to the other; the adhesive is heated for its hardening adhesion.

The silicone base adhesive used for the Invention is not limited as for its hardening method, elastic modulus or the like, however, preferably, heat hardening additional reaction type presents shorter hardening time and higher resistance and moreover, is more practical.

As for the color, if the key top part is to be illuminated, semi-translucent or translucent member should be used.

For applying adhesive, in addition to screen printing method, dispenser method, potting method, pad-printing method, spray method or transfer method may also be used without particular specification.

According to the Invention, the rigid resin key top sticks securely with silicone base adhesive, by disposing urethane base adhesive substrate layer on the back of the rigid resin key top. It may be the result of an effective interaction between urethane links contained in the urethane base adhesive substrate layer and OH-group or CN-group contained in the silicone base adhesive at the adhesion interface.

Now the Invention will be described more concretely referring to examples and comparative examples, but it should be noted that the Invention is not limited to them.

EXAMPLE 1

As shown in FIG. 1, a key pad 1 is formed with silicone rubber compound (SH861 supplied by TORAY-Dow Corning Silicone Co., Ltd.) by disposing irregularities for the rigid resin key top positioning. Silicone baseadhesive (TSE3221 supplied by Toshiba Silicone Co., Ltd.) 3 is applied to an adhesion portion 2 of a key top by screen printing method. Separately, a graphic printing 5 is made with polyester base printing ink (PC-8000 supplied by Jujo Kako Co., Ltd.) on the surface of a rigid resin key top 4 formed with polycarbonate resin (Panlite L1225L supplied by Teijin Kasei Co., Ltd.) and hard coated with UV hardening type hard coat agent (3070 supplied by Three Bond Co., Ltd.), then urethane base ink (SG410 supplied by Seiko Advance Co., Ltd.) 7 is applied as adhesive substrate layer by the dispenser on a key pad adhesion portion 6 of the key top 4, hardened and dried, then the key top and the key pad are assembled by fitting the irregularities defined on their adhesion portion, and heated at 120° C. for 10 minutes for hardening adhesion.

In the key detachment test of this key pad with rigid resin key top, only the portion A in the figure is fixed, the portion B is pulled in the direction shown by the arrow by the traction rate of 50 mm/min to measure the exfoliation resistance, obtaining, as the result, 1.1 Kg. At this moment, a part of the keypad was destroyed from the portion C in the figure.

EXAMPLE 2

As shown in FIG. 2, to an adhesion portion 8 of a key top of a key pad 1 formed with silicone rubber compound (SH861 supplied by TORAY-Dow Corning Silicone Co., Ltd.), silicone base adhesive (TSE3221 supplied by Toshiba Silicone Co., Ltd.) 9 is applied by screen printing method. Character printing 11 is made with printing ink (PC-8000 supplied by Jujo Kako Co., Ltd.) on the back of a rigid resin key top 10 formed with translucent polycarbonate resin (Panlite L1225L supplied by Teijin Kasei Co., Ltd.), then translucent urethane base ink (SG410 supplied by Seiko Advance Co., Ltd.) 12 is printed thereon as adhesive substrate layer, then this rigid resin key top 10 and the adhesion portion 8 of the key top is assembled, and heated at 120° C. for 10 minutes for hardening adhesion.

As in the example 1, the exfoliation resistance of this keypad with rigid resin key top was 1.0 Kg. At this moment, a part of the keypad was destroyed from the portion C in the figure.

EXAMPLE 3

As shown in FIG. 3, to an adhesion portion 14 of a key toy top of a key pad 13 formed with silicone rubber compound (SH861 supplied by TORAY-Dow Corning Silicone Co., Ltd.), silicone base adhesive (TSE3221 supplied by Toshiba Silicone Co., Ltd.) 15 is applied by screen printing method. Character printing 17 is made with colored printing ink (SG410 supplied by Seiko Advance Co., Ltd.) on the back of a rigid resin key top 16 formed with translucent polycarbonate resin (Panlite L1225L supplied by Teijin Kasei Co., Ltd.), then this rigid resin key top 16 and the key top adhesion portion 14 are assembled, and heated at 120° C. for 10 minutes for hardening adhesion.

The exfoliation resistance of this keypad with rigid resin key top was 1.0 Kg. At this moment, a part of the keypad was destroyed from the portion C in the figure.

COMPARATIVE EXAMPLE 1

As shown in FIG. 4, a key pad 18 is formed with silicone rubber compound (SH861 supplied by TORAY-Dow Corning Silicone Co., Ltd.) by disposing convex irregularities for a rigid resin key top positioning. Silicone base adhesive (TSE3221 supplied by Toshiba Silicone Co., Ltd.) 20 is applied to an adhesion portion 1a of a key top 9 by clean printing method. Separately, a graphic printing 22 is made with printingink (PC-8000 supplied by Jujo Kako Co., Ltd.) on the surface of a rigid resin key top 21 formed with polycarbonate resin (Panlite supplied by Teijin Kasei Co., Ltd.). This key top is adhered by fitting into the irregularities defined on the adhesion portion 19 of the key top, and heated at 120° C. for 10 minutes for hardening adhesion.

As in the example 1, the exfoliation resistance of this keypad with rigid resin key top was 0.3 Kg. At this moment, the part D of the figure was exfoliated at the interface between the key top and the silicone base adhesive layer.

COMPARATIVE EXAMPLE 2

As shown in FIG. 5, to an adhesion portion 24 of a key toy top of a key pad 23 formed with silicone rubber compound (SH861 supplied by TORAY-Dow Corning Silicone Co., Ltd.), silicone base adhesive (TSE3221 supplied by Toshiba Silicone Co., Ltd.) 25 is applied by screen printing method. Character printing 27 is made with printing ink (PC-8000 supplied by Jujo Kako Co., Ltd.) on the back of a rigid resin key top 26 formed with translucent polycarbonate resin (Panlite L1225L supplied by Teijin Kasei Co., Ltd.). This rigid resin key top 26 and the key top adhesion portion 24 are assembled together, and heated at 120° C. for 10 minutes for hardening adhesion.

As in the example 1, the exfoliation resistance of this key pad with rigid resin key top was 0.2 Kg. At this moment, the part D of the figure was exfoliated at the interface between the printing ink layer of the key top and the adhesive layer of the silicone base .

The adhesion resistance of the rigid resin key top of keypads with rigid resin key top shown in examples 1, 2 and 3 was satisfactory. On the other hand, the adhesion resistance of the rigid resin key top of key pads with rigid resin key top of comparative examples 1 and 2 are insufficient, so exfoliation was observed at the interface between the rigid resin key top and the silicone base adhesive layer in the comparative example 1, and at the interface between the ink face printed to the rigid resin key top and the silicone base adhesive layer in the comparative example 2.

EFFECT OF THE INVENTION

As described before, the key pad with rigid resin key top of the present Invention provides an advantage of realizing a high productivity key pad, preventing key top detachment or dislocation, and allowing to omit key detachment prevention means such as collar and to simplify its structure, through the improvement of the adhesion resistance of silicone base adhesive, by preparing urethane base adhesive substrate layer on the back of the key top made of rigid resin.

What is claimed is:

1. A method of making a key pad in combination with a rigid resin key top, the method comprising the steps of:
   providing a silicone rubber key pad and a rigid resin key top;
   applying a silicone base adhesive to an adhesion portion of a silicone rubber key pad;
   preparing a urethane base adhesion substrate layer;
   applying the urethane base adhesion substrate layer to a portion of the rigid resin key top; and
   adhering the rigid resin key top to the silicone rubber key pad by applying the rigid resin key top having the urethane base adhesion substrate layer to the adhesion portion of the silicone rubber key pad.

2. The method according to claim 1, wherein said urethane base adhesion substrate layer is a graphic printed urethane base ink layer.

3. A key pad in combination with a rigid resin key top, formed by the method comprising the steps of:
   providing a silicone rubber key pad and a rigid resin key top;
   applying a silicone base adhesive to an adhesion portion of a silicone rubber key pad;
   preparing a urethane base adhesion substrate layer;
   applying the urethane base adhesion substrate layer to a portion of the rigid resin key top; and
   adhering the rigid resin key top to the silicone rubber key pad by applying the rigid resin key top having the urethane base adhesion sustrate layer to the adhesion portion of the silicone rubber key pad.

4. The key pad with rigid resin key top according to claim 3, wherein said urethane base adhesion substrate layer is a graphic printed urethane base ink layer.

5. A key pad and resin key top combination, comprising:
   a silicone rubber key pad with an adhesion portion;
   a silicone base adhesive on said silicone rubber key pad adhesion portion;
   a rigid resin key top with a back;
   an adhesive substrate layer on said back of said rigid resin key top, said adhesive substrate layer having a urethane base adhesion substrate layer on a portion to be adhered to said silicone base adhesive on said key pad.

6. The key pad according to claim 5, wherein the adhesive substrate layer includes a graphic printed urethane base ink layer.

* * * * *